United States Patent [19]
Baker et al.

[11] Patent Number: 5,156,459
[45] Date of Patent: Oct. 20, 1992

[54] RADIATION BEAM CALORIMETRIC POWER MEASUREMENT SYSTEM

[75] Inventors: John Baker, Livermore; Leland F. Collins, Pleasanton; Thomas C. Kuklo, Ripon; James V. Micali, Dublin, all of Calif.

[73] Assignee: The United States of America as represented by the United States Department of Energy, Washington, D.C.

[21] Appl. No.: 839,663

[22] Filed: Feb. 13, 1992

Related U.S. Application Data

[63] Continuation of Ser. No. 652,360, Feb. 7, 1991, abandoned, which is a continuation of Ser. No. 401,697, Sep. 1, 1989, abandoned.

[51] Int. Cl.[5] .................................... G01K 17/00
[52] U.S. Cl. .................................. 374/32; 374/41; 324/95
[58] Field of Search ............... 374/32, 40, 41; 324/95

[56] References Cited

U.S. PATENT DOCUMENTS

| | | |
|---|---|---|
| 2,560,536 | 7/1951 | Althouse .............................. 374/32 |
| 3,384,819 | 5/1968 | Rinkel ................................. 374/32 |
| 3,459,945 | 8/1969 | Astheimer et al. .................. 374/32 |
| 3,464,267 | 9/1969 | Ehrlich et al. ...................... 374/32 |
| 3,487,685 | 1/1970 | Shifrin ................................ 374/32 |
| 4,037,470 | 7/1977 | Mock et al. ......................... 374/32 |
| 4,189,765 | 2/1980 | Kotalick et al. .................... 364/188 |
| 4,413,916 | 11/1983 | Seguin ................................. 374/32 |
| 4,440,506 | 4/1984 | Eitel ................................... 374/32 |
| 4,485,449 | 11/1984 | Knauss ................................ 374/41 |
| 4,522,511 | 6/1985 | Zimmerer ........................... 374/32 |
| 4,773,023 | 9/1988 | Giardina ............................. 374/41 |
| 4,865,446 | 9/1989 | Inoue et al. ......................... 374/32 |

FOREIGN PATENT DOCUMENTS

| | | | |
|---|---|---|---|
| 0065201 | 11/1982 | European Pat. Off. ............ 374/41 |
| 2256372 | 5/1974 | German Democratic Rep. ... 374/32 |
| 3243198 | 5/1984 | German Democratic Rep. ... 374/41 |
| 1271239 | 4/1972 | United Kingdom ................ 374/32 |

OTHER PUBLICATIONS

Lovell, S. et al., "A flow calorimetric method of determining electron beam energy," Physics in Medicine and Biology, vol. 21, No. 2, pp. 198-208 (Mar. 1976).

Willoughby, A. B., "Absolute Water Flow Calorimeter for the Measurement of Intense Beams of Radiant Energy," The Review of Scientific Instrum., vol. 25, No. 7 (Jul. 1954).

*Primary Examiner*—William A. Cuchlinski, Jr.
*Assistant Examiner*—Diego F. F. Gutierrez
*Attorney, Agent, or Firm*—Miguel A. Valdes; Roger S. Gaither; William R. Moser

[57] ABSTRACT

A radiation beam calorimetric power measurement system for measuring the average power of a beam such as a laser beam, including a calorimeter configured to operate over a wide range of coolant flow rates and being cooled by continuously flowing coolant for absorbing light from a laser beam to convert the laser beam energy into heat. The system further includes a flow meter for measuring the coolant flow in the calorimeter and a pair of thermistors for measuring the temperature difference between the coolant inputs and outputs to the calorimeter. The system also includes a microprocessor for processing the measured coolant flow rate and the measured temperature difference to determine the average power of the laser beam.

8 Claims, 5 Drawing Sheets

RADIATION BEAM CALORIMETRIC POWER MEASUREMENT SYSTEM

This is a Continuation of application Ser. No. 07/652360, filed Feb. 7, 1991, now abandoned, which is a Continuation of application Ser. No. 07/401697, filed Sep. 1, 1989, now abandoned.

FIELD OF THE INVENTION

The United States Government has rights in this invention pursuant to Contract No. W-7405-ENG-48 between the United States Department of Energy and the University of California for operation of the Lawrence Livermore National Laboratory.

BACKGROUND OF THE INVENTION

The present invention relates to a measurement system for measuring average beam power, such as a laser beam, a microwave beam, and the like.

In a laser beam environment having high power laser beam systems utilizing power levels in the range of 100 watts or more, it is desirable to precisely determine the average power of the beam itself.

Some prior art approaches have utilized some form of thermocouple upon which a laser beam is transmitted. The thermocouple provides a signal representative of the magnitude of the power of the laser beam.

Other approaches utilize a calorimeter requiring, in general, some form of flow controller to precisely control the flow of a coolant (typically water) through a heat exchanger. In such prior art approaches, the laser beam is transmitted to the calorimeter, which utilizes some form of thermopile to provide a DC voltage signal corresponding to the power of the laser beam.

U.S. Pat. No. 4,522,511 discloses a continuously flowing calorimeter which uses a thermopile to measure the temperature difference between the inlet coolant and the outlet coolant. The '511 patent also uses a thermopile attached to the inlet and outlet cooling water tubing to eliminate the need for independent temperature sensing devices with possible non-identical characteristics. The method of attaching a thermopile directly to the tubing could lead to errors because of heat loss or heat gain along the tubing, and also as a result of heat flow across the thermopile. The heat absorbed at the absorber may be determined as a function of temperature difference between the coolant in the inlet leg of the conduit and the heated coolant in the outlet leg of the conduit, but does not mention that the temperature difference is also a function of the coolant flow rate.

That patent also requires calibration at a certain coolant flow rate, and the calibration flow rate must be maintained for all subsequent power measurements. This reduces the flexibility in obtaining laser beam power measurements.

SUMMARY OF THE INVENTION

It is an object of the present invention to provide an improved calorimeter system for measuring the average beam power such as a laser beam, microwave beam and the like.

Briefly, the present invention provides a laser beam calorimetric power measurement system comprising calorimeter being cooled by a continuously flowing coolant in a coolant jacket for absorbing light from a laser beam to convert the laser beam energy into heat. The system further includes means for measuring the rate of the coolant flow in the calorimeter means, means for measuring the temperature difference between the coolant input and output of the calorimeter means, and means for processing the measured coolant flow and the measured temperature difference to determine the average power of the laser beam.

Additional objects, advantages and novel features of the present invention will be set forth in the description which follows and in part become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of this specification, illustrate an embodiment of the invention and, together with the description, serve to explain the principles of the invention.

DETAILED DESCRIPTION OF THE DRAWINGS

Reference will now be made in detail to a preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
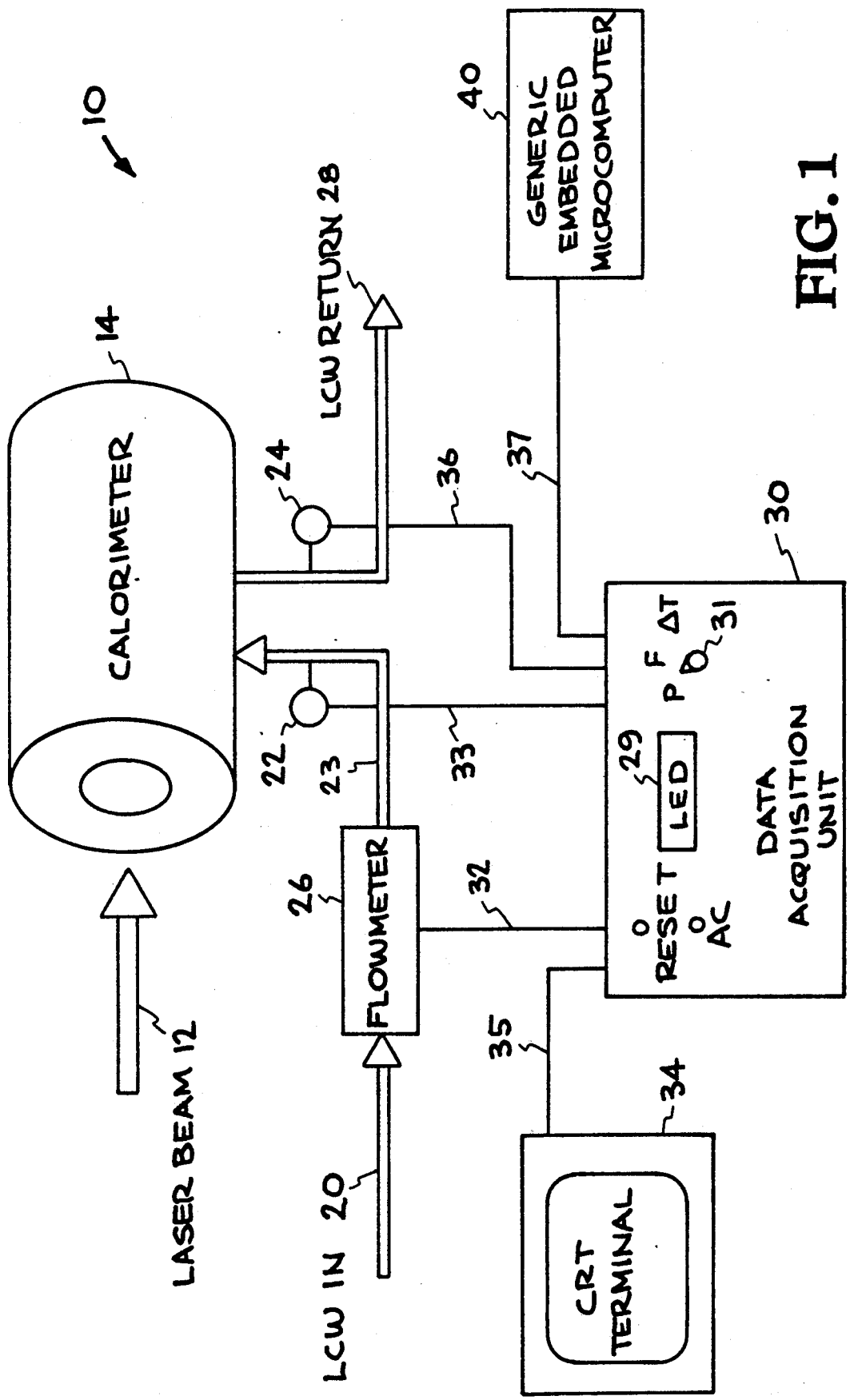
FIG. 1 depicts a block diagram of a laser beam calorimetric power measurement system.

Referring now to FIG. 1, a laser beam calorimetric power measurement system 10 is depicted therein, although it should be understood that the aspects of the present invention apply to other radiation beams, such as microwave beams and the like.

In FIG. 1, the present invention is utilized for measuring the average power of the laser beam 12 which is transmitted to a calorimeter 14.

The calorimeter 14 includes a coolant jacket which is then cooled by a continuously flowing coolant (typically water) in a water jacket. Thermistors 22, 24 measure the temperature difference between the coolant (water) input and output, respectively, from the calorimeter 14. A thermistor could typically be Omega/YSI OL-703 linear thermistor.

Figure 2:
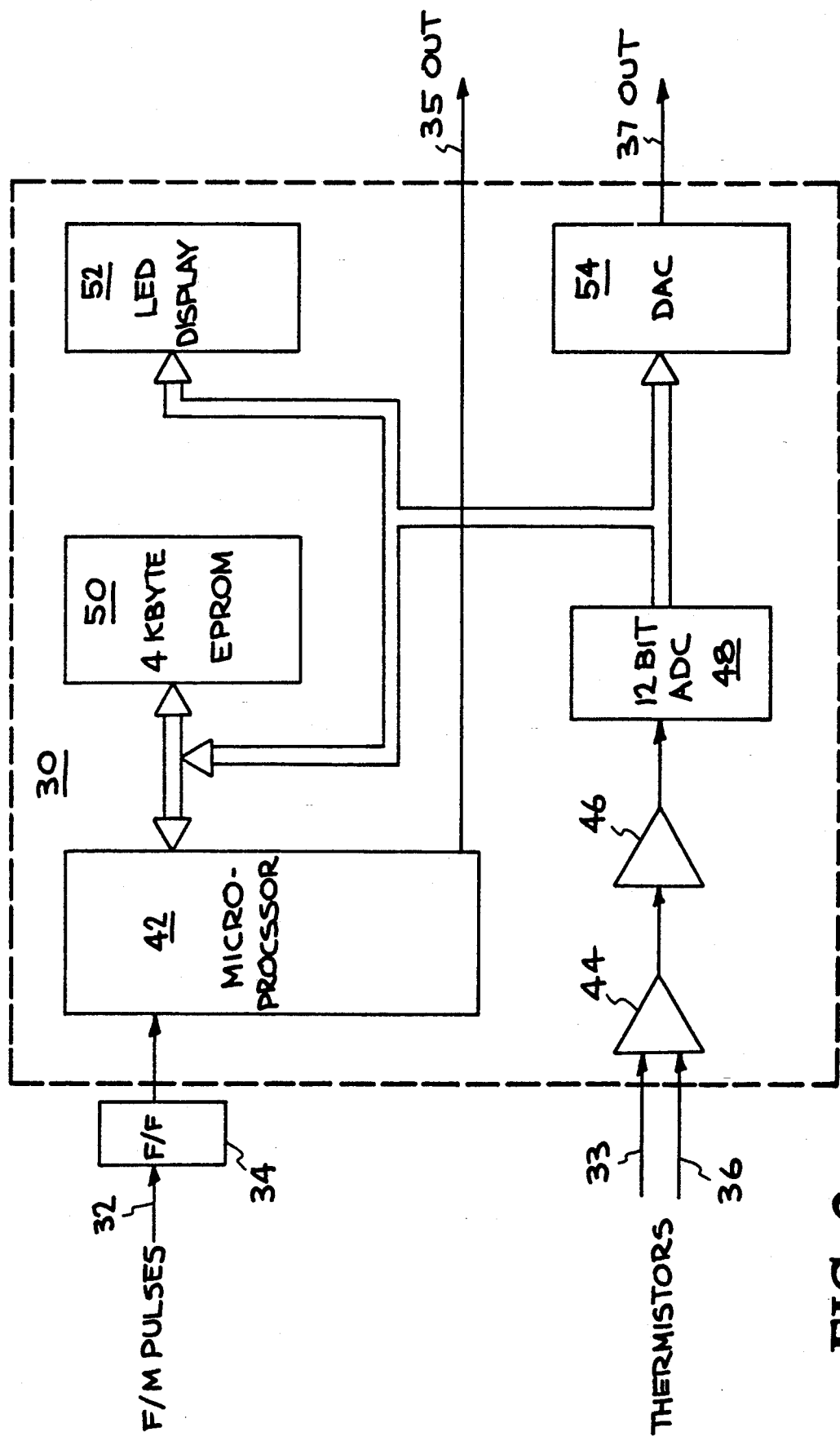
FIG. 2 depicts a block diagram of a data acquisition/data processing system utilized in the power measurement system of FIG. 1.

The measured temperature differential signals from linear thermistors 22, 24 are input to a highly accurate laser power measurement system 30, which is described in more detail in FIG. 2.

In FIG. 1, the coolant, desirably in the form of low conductivity water (LCW) is input on inlet 20 through flowmeter 26 to calorimeter 14. The LCW coolant is output from calorimeter 14 on outlet 28.

The flow meter 26 could be a flow meter manufactured by Flow Technology, such as Model FTO-4, which will provide a signal to the laser power measurement system on lead 32 as a measurement of the flow of the coolant through calorimeter 14. The flow rate typically is in units of gallons per minute.

Laser power measurement system 30 receives the measured temperature differential from thermistors 22, 24, and the rate of flow from flow meter 26, and processes the measured signals to provide an output representative of the average power of the laser beam 12.

The outputs can be output to a CRT terminal 34 through lead 35 and, as an output to some form of generic embedded microcomputer (GEM) 40 via lead 37.

The system 10 is a continuous flow calorimeter along with a microprocessor-based data acquisition unit 30, which is shown in more detail in FIG. 2.

The heart of the system is the continuous flow calorimeter 14, which absorbs the light from laser beam 12, converting the laser beam energy into heat. The calorimeter 14 is cooled by the continuously flowing water in a water jacket. The basic principle with the continuous flow calorimeter 14 is that the power absorbed in the continuously flowing water is equal to a constant (approximately 264.1) multiplied by the product of the water flow (gallons per minute) and the temperature rise of the water (degrees Celsius, °C.). The temperature rise is the difference between the outlet water temperature and the inlet water temperature.

*The heat absorbed* $= K \times$ *(temperature difference)* $\times$ *(coolant flow rate)* where the heat absorbed is in watts and K is approximately 264.1 if the temperature difference is in degrees Celsius and the water coolant flow is in gallons per minute. It is more desirable to measure the coolant flow rate to be able to directly compute the heat absorbed for a wide range of coolant flow rates.

The laser power measurement device measures both quantities (coolant temperature differences and flow rate) needed for determining the power absorbed from the laser beam. Also, the present invention processes the necessary computations, linearizing the flowmeter data, filtering the flow data, and multiplying temperature difference by flow rate and 264.1 to provide the laser power measurement.

Calorimeter 14 is cup-shaped with a black ceramic coating "flame sprayed" on the inner surface to absorb the laser beam 12. Laser beam 12 enters the mouth of calorimeter 14 and strikes the side walls and the rear of the calorimeter, which is shaped to cause most of the beam to be reflected back to the side walls. Most of the beam strikes the inner walls of calorimeter 14 at two places, causing approximately 99% of the beam to be absorbed. Inlet water 20 flows into the mouth end of calorimeter 14 and passes through the water jacket in a helical pattern from the mouth end of calorimeter 14 to the rear end. Fittings are provided in the water inlet tubing and the water outlet tubing for thermistors 22, 24 to be installed for measuring the inlet and outlet water temperatures. A flow meter 26 is installed externally for measuring the water flow.

Referring not to FIG. 2, data acquisition unit 30 is shown in more detail. The microprocessor-based data acquisition unit 30 determines the water flow rate and the temperature rise from signals received from flow meter 26 and the two thermistors 22, 24, and computes the power absorbed in calorimeter 14 once per second. Pulses from flow meter 26 are counted by microprocessor 42 over a one-second period and converted to a flow rate in gallons per minute, correcting for non-linearities in the flow meter calibration data. Microprocessor 42 can be easily re-calibrated for other flow meters. A differential voltage on leads 33, 36 corresponding to the temperature rise of the water, is produced by the two thermistors.

Data acquisition unit 30 measures the differential voltage and converts that voltage to the temperature rise in °C. once per second. Firmware stored in EPROM 50 in data acquisition unit 30 filters the flow meter data mathematically to remove fluctuations, then multiplies the filtered flow value by the temperature and a constant, 264.1, to compute the power absorbed by the calorimeter. The water temperature rise in °C., the flow rate in gallons per minute, or the power absorbed in watts, can be displayed on an LED display unit 52. The value to be displayed on LED unit 52 is selected by rotary switch 31 of FIG. 1. Also, a serial output data stream allows these three values to be displayed remotely on CRT terminal 34 of FIG. 1. Finally, an output DC voltage allows the power level to be monitored remotely by way of a voltmeter or analog-to-digital converter 40. This output voltage is calibrated so that 0 to 10 volts DC corresponds to 0 to 2000 watts absorbed by calorimeter 14.

Figure 3:
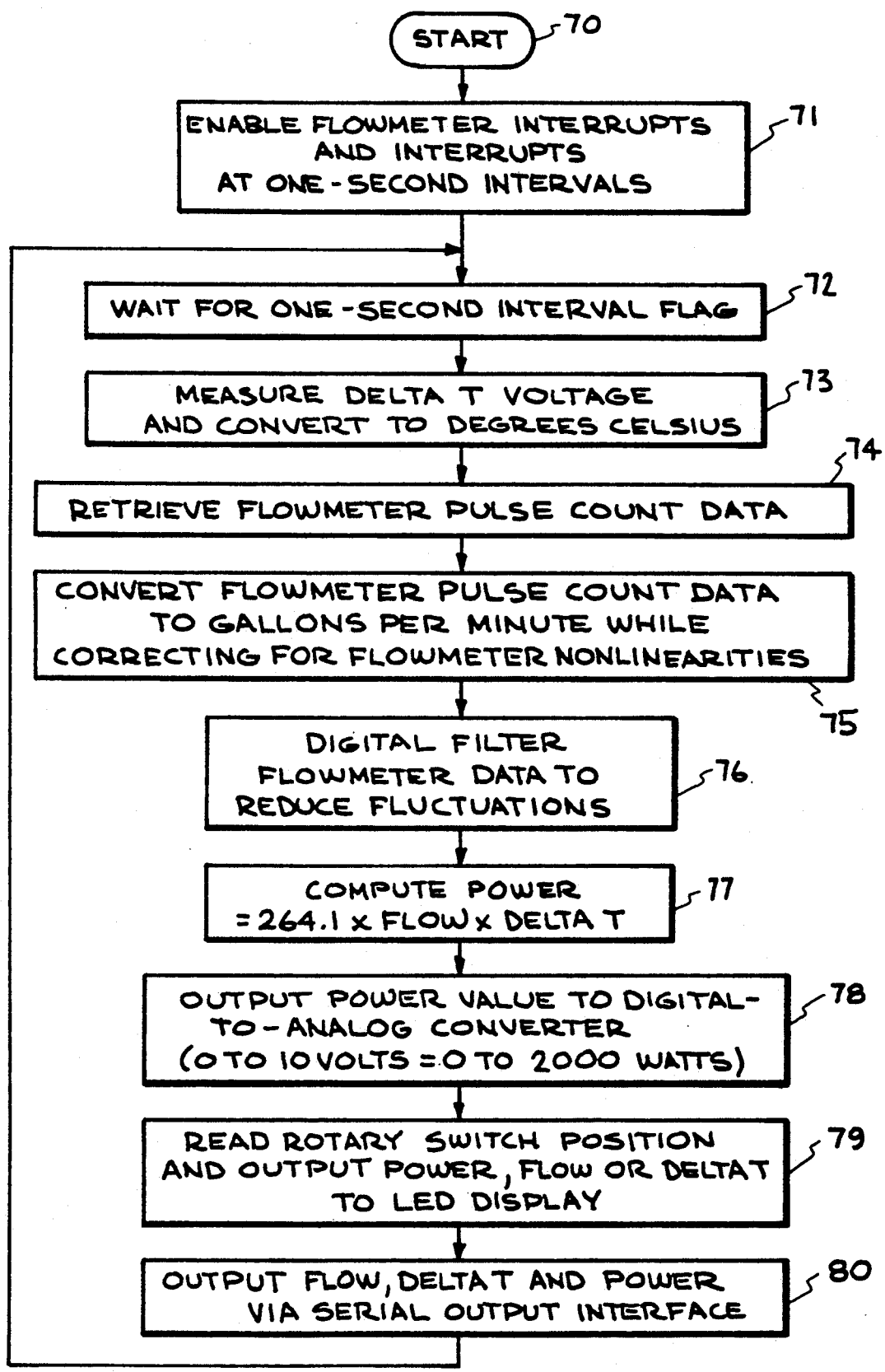
FIG. 3 depicts a flow chart illustrating the calorimeter firmware according to the present invention.

Referring now to FIG. 3, a diagram of the calorimeter firmware main program is depicted. The sequence of steps depicted in FIG. 3 will be taken in conjunction with the diagram depicted in FIGS. 1 and 2.

Figure 5:
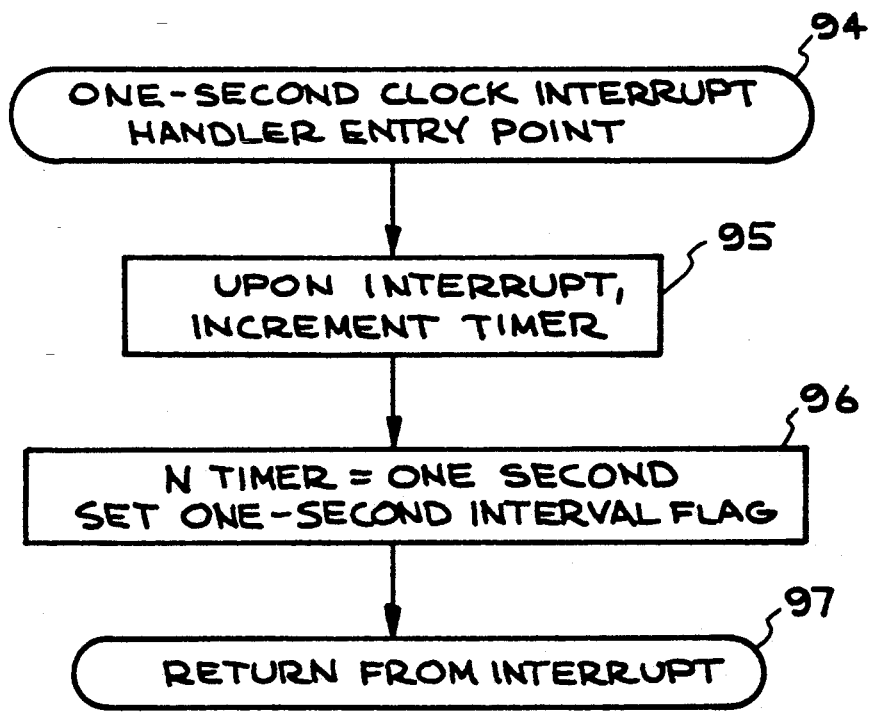
FIG. 5 depicts a flow chart of a one-second timer interrupt according to the present invention.

In FIG. 3, the start step 70 advances to step 71, in which the processor 42 of FIG. 2 enables the flow meter interrupts 26 and interrupts at one-second intervals (depicted in FIG. 5).

At step 72, the system waits for a one-second interval flag.

At step 73, the system measures the Delta T voltage and converts this to degrees Celsius.

At step 74, the system retrieves the flowmeter pulse count data from flowmeter 26 of FIG. 1.

At step 75, the system converts the flowmeter pulse count data to gallon per minute, while correcting for flowmeter non-linearities.

At step 76, the system uses a digital filter on the flowmeter data to reduce fluctuations.

At step 77, the system computes the power according to the formula identified above, namely Power $= 264.1 \times$ Flow $\times$ Delta T.

At step 78, the system outputs the power value to the digital to analog converter 54 of FIG. 2. This is an output of 0 to 10 volts corresponding to 0 to 2,000 watts.

At step 79, the system reads the rotary switch position 31 of FIG. 1 and outputs the power, flow or Delta T to the LED display 29 of FIG. 1.

Finally, at step 80, the system outputs the flow, Delta T and power via the serial output interface for connection to, for example, CRT terminal 34, and also for possible output to the GEM 40.

After step 80 in FIG. 3, the system returns to initiating step 72, as indicated.

Figure 4:
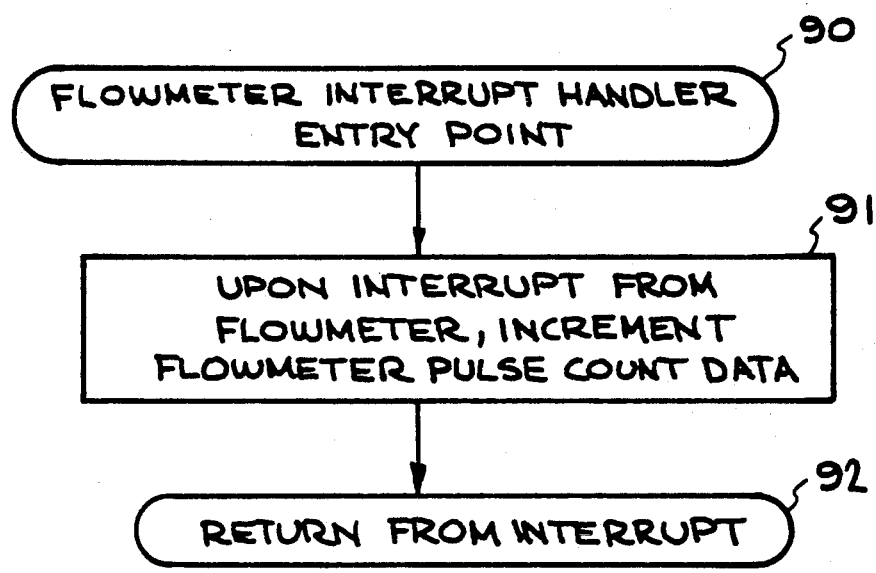
FIG. 4 depicts a program of the flowmeter interrupt according to the present invention.

FIG. 4 depicts the flowmeter interrupt handler flow chart.

At step 90, the flowmeter interrupt handler entry point proceeds next to step 91 which, upon interrupt from the flowmeter, increments the flowmeter pulse count data.

At step 92, the system returns from interrupt.

FIG. 5 depicts a one-second timer interrupt handler flow chart.

At step 94, at the one-second clock interrupt handler entry point, the system proceeds to step 95, which, upon interrupt, increments the timer.

At step 96, if the timer equals one second, a set one-second interval flag occurs, and the system proceeds to step 97, which is return from interrupt.

Figure 6B:
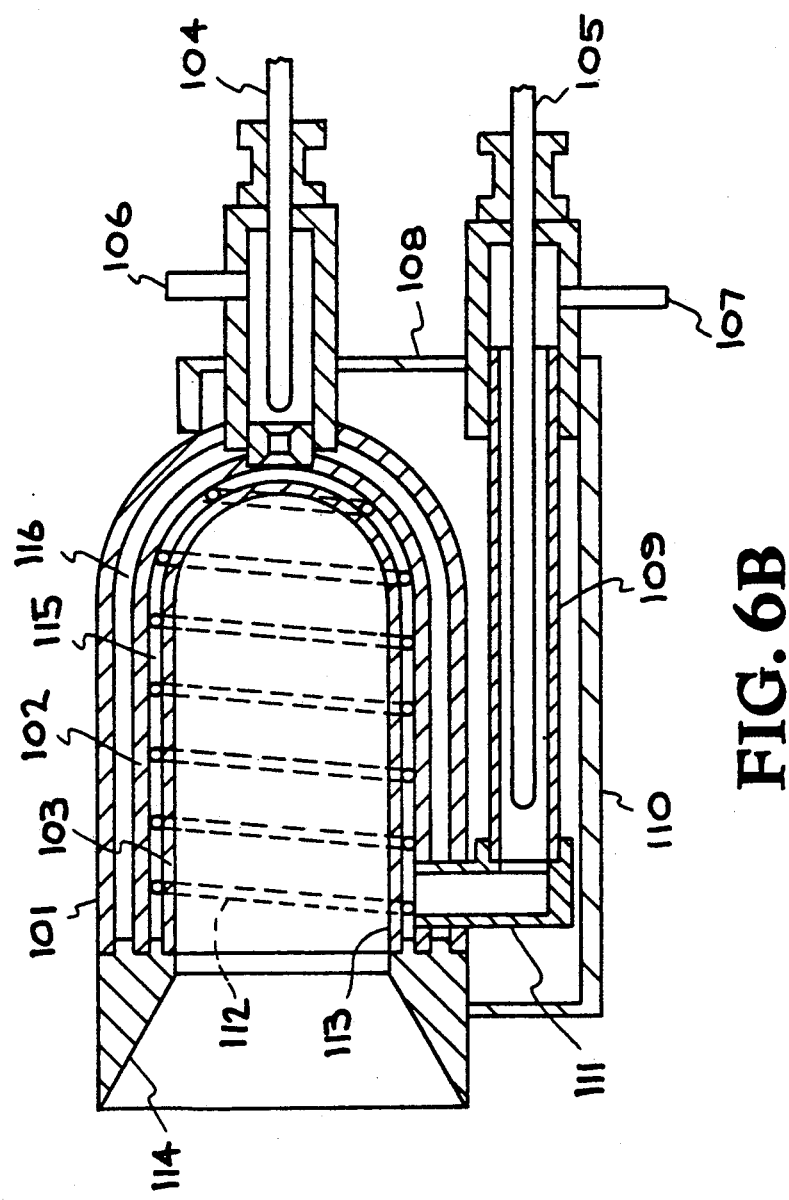
FIGS. 6A and 6B depict front view (looking into calorimeter mouth) and assembly cross-sectional views, respectively, of a calorimeter which forms a portion of the system of FIG. 1.
Figure 6A:
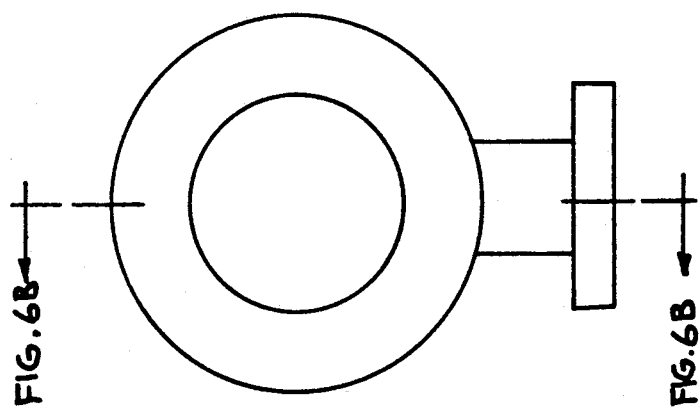

The following descriptions pertain to the numbered components shown on the sectional calorimeter assembly view (through its vertical center plane) depicted in FIG. 6B. This assembly also shows a view looking down the mouth of the calorimeter in FIG. 6A of the calorimeter.

All materials described as SS are made of 304L Stainless Steel. All materials described as OFC are made of UNSC10100 oxygen free electronic copper.

In FIG. 6B, the outer SS thermal insulating shell 101 insulates heat transfer by radiation from the inner insulating shell 102. Shell 101 also insulates convection and conduction heat transfer losses out of the calorimeter due to its own thermal resistance and by confining a region of stagnant air 116.

Inner SS thermal insulating shell 102 insulates heat transfer losses out of the calorimeter by conduction, radiation and convection due to its own thermal resistance. Shell 102 also confines the water cooling channel 115.

OFC absorbing shell 103, due to this shell's geometry and properties, provides minimal resistance to heat transfer through (itself and into the water cooling channel 115. When shell 103 is coated with the black frame sprayed ceramic 113, they both combine to provide the absorbing surface of the calorimeter. OFC shell 103 also confines the water cooling channel 115 in conjunction with component 102.

Outlet thermistor 104 is 2" in length and is a Yellow Springs thermilinear 703 thermistor probe.

Inlet thermistor 105 is 6.75" in length and is a Yellow Springs thermilinear 703 thermistor probe.

Outlet water fitting 106 provides two connections in an L arrangement. Outlet thermistor 104 is inserted straight through the fitting 106, while the water is removed 90° from it. Fitting 106 is designed with a venturi contraction to provide further water turbulence and mixing for improved heat transfer.

Inlet water fitting 107 serves the same purposes as does the outlet fitting 106, only for the calorimeter water inlet and inlet thermistor 105. However, fitting 107 does not have a venturi contraction.

SS cover plates 108 completes the inlet/outlet insulation hull 110 by helping to contain the stagnant air which insulates the calorimeter's inlet/outlet fittings from heat losses.

Inlet water SS transport tube 109 carries the water from the inlet fitting 107 to the 90° elbow 111, and also provides some thermal insulation for the calorimeter.

Inlet/outlet SS insulating hull 110 surrounds and thermally insulates the inlet and outlet components 104, 105, 106, 107, 109, 111 from heat transfer losses when combined with cover 108.

90° SS elbow 111 directs the inlet water from the inlet water tube 109 to the cooling channel 115. Elbow 111 is welded to the inner insulating shell 102 and isolated from the rest of the calorimeter to minimize calorimeter heat losses.

SS wire helical coil 112 of solid SS is attached to the back side of the OFC copper shell 103, and thereby creates turbulence which sets up the helical water flow through the water cooling channel 115. Since this wire is thinner than the water channel 115, it also prevents a direct conduction heat transfer path from the absorbing surface 103 and the inner insulating shell 102.

Plasma flame sprayed black ceramic coating 113 is composed of 60% aluminum oxide and 40% titanium dioxide. This coating is applied to the inside surface of the OFC absorber 103 and provides a rugged, diffuse Lambertian surface to provide optimal laser beam absorption.

Reflective SS ring 114 provides the structural anchor of the calorimeter design. All shells 101, 102, 103, 110 are attached to this ring in the coolest location on the calorimeter and, due to its thermal resistance abilities, the reflective ring provides maximum conduction heat transfer insulation from the absorbing surface 103 to the rest of the calorimeter and external environment. Furthermore, this ring, being polished and very reflective on the angled surface, serves to reflect any misaligned laser beams into the calorimeter.

Cooling water channel 115 is confined by the inner insulation shell 102 and the absorbing shell 103.

Stagnant air insulating region 116 provides insulation to conduction and convection heat transfer out of the calorimeter to the environment. This region is confined by the inner and outer insulating shells 102 and 101, respectively.

The laser beam enters the mouth of the calorimeter. The laser beam then strikes the absorbing surface composed of components 103 and 113. As described above, the thermal design of all of the calorimeter components is such as to maximize the heat transfer from the absorbing surface to the cooling water channel and to the temperature and power measurement instrumentation, and at the same time minimizes the heat transfer from the absorber to any other part of the calorimeter and environment. The net result is to provide as little as possible heat loss for a more accurate power measurement.

The foregoing description of a preferred embodiment of the invention has been presented for purposes of illustration and description. It is not intended to be exhaustive or to limit the invention to the precise form disclosed, and obviously many modifications and variations are possible in light of the above teaching.

The present embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A radiation beam calorimetric power measurement system comprising calorimeter means including a structure with a coating for absorbing a radiation beam and being cooled by continuously flowing coolant in a coolant jacket, said calorimeter means and coolant jacket configured to operate over a wide range of coolant flow rates, and for absorbing light from said radiation beam to convert the beam energy into heat, and microprocessor based data acquisition means including means for measuring in repetitive time periods the coolant flow rate in said calorimeter means, means for measuring in repetitive time periods the temperature difference between the coolant input and output of said calorimeter means where said temperature difference occurs as a result of the conversion of the beam energy into heat, and means for automatically processing the measured coolant flow rate and the measured temperature difference to determine the power of said beam.

2. The system as in claim 1 further including digital filter means for smoothing fluctuations in the coolant flow measurement.

3. The system as in claim 1 wherein said temperature difference measuring means includes thermistor means for measuring the temperature difference between said coolant input and output.

4. The system as in claim 1 wherein said coolant flow rate measuring means includes a flow meter for measuring the rate of flow of said coolant through said calorimeter means.

5. The system as in claim 1 wherein said structure is cup-shaped and said coating is a black ceramic coating on the inner surface of said structure.

6. The system as in claim 1 wherein said beam is a laser beam.

7. The system as in claim 1 wherein said beam is a microwave beam.

8. A method for determining the power of a beam using a radiation calorimetric power measurement system having calorimeter means including a structure with a coating for absorbing a radiation beam and being cooled by continuously flowing coolant in a coolant jacket, said calorimeter means and coolant jacket configured to operate over a wide range of coolant flow rates and for absorbing light from said radiation beam to convert the beam energy into heat, and microprocessor based data acquisition means, the method comprising the steps of using said microprocessor based data acquisition means to perform the steps of measuring in repetitive time periods the rate of the coolant flow in said calorimeter means, measuring in repetitive time periods the temperature difference between the coolant input and output of said calorimeter means where said temperature difference occurs as a result of the conversion of the beam energy into heat, and automatically processing the measured coolant flow rate and the measured temperature difference to determine the power of said beam.

* * * * *